(12) United States Patent
Timmermann (10) Patent No.: US 8,808,839 B2
(45) Date of Patent: Aug. 19, 2014

(54) VEHICLE GLAZING, METHOD FOR THE PRODUCTION THEREOF, AND USE

(75) Inventor: Alwin Timmermann, Köln (DE)

(73) Assignee: Saint-Gobain Glass France, Courbevoie (FR)

( * ) Notice: Subject to any disclaimer, the term of this patent is extended or adjusted under 35 U.S.C. 154(b) by 564 days.

(21) Appl. No.: 13/146,639

(22) PCT Filed: Apr. 19, 2010

(86) PCT No.: PCT/EP2010/055093
§ 371 (c)(1),
(2), (4) Date: Jul. 27, 2011

(87) PCT Pub. No.: WO2010/121982
PCT Pub. Date: Oct. 28, 2010

(65) Prior Publication Data
US 2011/0281095 A1 Nov. 17, 2011

(30) Foreign Application Priority Data
Apr. 23, 2009 (DE) .................. 10 2009 018 348

(51) Int. Cl.
  *B32B 1/00* (2006.01)
  *B32B 3/00* (2006.01)
  *B32B 17/10* (2006.01)
  *B60R 11/04* (2006.01)
  *B60S 1/08* (2006.01)
  *B60R 11/00* (2006.01)

(52) U.S. Cl.
  CPC ......... *B32B 17/10036* (2013.01); *B60S 1/0833* (2013.01); *B60R 2011/0026* (2013.01); *B32B 17/10165* (2013.01); *B60R 11/04* (2013.01); *B60S 1/0822* (2013.01)

USPC .............. 428/174; 428/31; 428/412; 156/285

(58) Field of Classification Search
USPC ........... 428/174, 426, 31, 412, 78; 250/208.1, 250/227.25; 296/97.2, 97.7; 348/148; 156/285
See application file for complete search history.

(56) References Cited

U.S. PATENT DOCUMENTS

| | | | |
|---|---|---|---|
| 6,276,100 | B1 | 8/2001 | Woll |
| 6,768,092 | B2 | 7/2004 | Sakata |
| 6,777,668 | B2 | 8/2004 | Krieg |

FOREIGN PATENT DOCUMENTS

| | | |
|---|---|---|
| DE | 4124766 | 12/1992 |
| DE | 19947680 | 8/2000 |
| DE | 10012976 | 9/2001 |
| DE | 10054307 | 5/2002 |
| DE | 10160669 | 5/2003 |
| DE | 10342837 | 4/2005 |
| DE | 102004016517 | 10/2005 |
| DE | 102006039065 | 1/2007 |
| DE | 102006027044 | 4/2007 |

(Continued)

OTHER PUBLICATIONS

PCT Written Opinion issued for PCT Application No. PCT/EP2010/055093 filed on Apr. 19, 2010 in the name of Saint-Gobain Glass France (German and English).

(Continued)

*Primary Examiner* — Catherine A Simone
(74) *Attorney, Agent, or Firm* — Steinfl & Bruno, LLP (57) ABSTRACT

A vehicle glazing, method for the production of the vehicle glazing and the use of the vehicle glazing are described. The vehicle glazing comprises at least one transparent pane one transparent body, and at least one transparent polymer layer interposed between them.

19 Claims, 4 Drawing Sheets

Section A-A

(56) References Cited

FOREIGN PATENT DOCUMENTS

| | | |
|---|---|---|
| DE | 102007054047 | 8/2008 |
| EP | 1389565 | 2/2004 |
| GB | 2064506 | 6/1981 |
| WO | 2009/018907 | 2/2009 |

OTHER PUBLICATIONS

PCT International Search Report for PCT/EP2010/055093 filed on Apr. 19, 2010 in the name of Saint-Gobain Glass France (German and English).

Fig. 4 – Section A-A

VEHICLE GLAZING, METHOD FOR THE PRODUCTION THEREOF, AND USE

CROSS REFERENCE TO RELATED APPLICATIONS

The present application is the US national stage of International Application PCT/EP2010/055093 filed on Apr. 19, 2010 which, in turn, claims priority to German Application 10 2009 018 348.5, filed on Apr. 23, 2009.

BACKGROUND

The present invention relates to a new vehicle glazing with an optical coupling element for the transmission of electromagnetic radiation, in particular of image data in the visible wavelength range.

Moreover, the present invention relates to a new method for the production of a vehicle glazing with an optical coupling element.

Moreover, the present invention relates to the use of the vehicle glazing in vehicles with a driver assistance system.

In DE 10 2007 054 0 47 A1, a laminated glass pane for a vehicle is described, wherein the laminated glass pane comprises at least one outer glass pane and one inner glass pane, characterized in that the inner glass pane and the outer glass pane have different optical characteristics, and the inner glass pane has at least one notch or cutout. Thus, the laminated glass pane can have different optical transmission properties in different areas of its surface.

In DE 10 2006 027 044 A1, an optical means is disclosed, in particular, a prism or mirror system for an image recorder in a motor vehicle, wherein the optical means redirects the viewing direction of the image recorder in a predefined spatial angle range. The optical means is, preferably, mounted in the region of the exterior mirror.

From DE 100 54 307 A1, a light coupling element for reduction of reflections with the coupling of a light beam into a transparent pane is known, wherein the light beam strikes the pane at an angle other than perpendicular and the light coupling element has approx. the same refractive index as the pane and is arranged in a positively locking fashion on the pane. The light coupling element has a light entrance surface that is approx. vertical, at least in the point of incidence of the primary axis of the light beam.

DE 10 2006 039 065 A1 discloses a fastening device for an optical sensor on a vehicle pane.

DE 10 2007 054 047 A1 discloses a laminated glass pane for a vehicle with a heat insulating layer on the surface. The heat insulating layer has a notch in the region of a functional element.

The known optical coupling elements transmit electromagnetic radiation beams with optical distortion due to different path lengths of the light in the optically dense body, in particular with the transmission of image data. The image data have to be corrected with a significant outlay of computational power. Moreover, a comparatively large area of the glazing is necessary for the transmission of images into the interior, in particular with horizontally aimed image recorders and with a vehicle glazing installation angle deviating greatly from the vertical. This area is no longer available as a usable area, e.g., for the viewing field B according to ECE-R 43.

SUMMARY

An object of the present invention is to find a vehicle glazing wherein electromagnetic radiation beams of a transmitter and/or receiver are transmitted through the vehicle glazing such that a smallest possible area of the vehicle glazing is needed and the optical distortion, in particular of image data, is the least possible.

Another object of the present invention is to find a new method for the production of a vehicle glazing.

Another object of the present invention is to find a new use for a vehicle glazing.

The object is accomplished by means of a vehicle glazing that comprises at least:
  a) one transparent pane,
  b) one transparent body,
  c) at least one transparent polymer layer interposed between them,
wherein the transparent body is connected in a positively locking fashion to the transparent pane via the transparent polymer layer over at least one coupling surface, and the maximum width and the maximum length of the transparent body is smaller than the minimum width and the minimum length of the transparent pane and a transmission surface of the transparent body and the surface of the transparent pane run parallel to each other with maximum angle deviations of less than 10°.

The path of an electromagnetic radiation beam, in particular of an image datum, is roughly the same in the optically dense transparent pane and in the optically dense transparent body because of the parallel course of the surface of the transparent pane and the transmission surface of the transparent body as an optical coupling element. An image observed through the transparent pane and the transparent body appears either not distorted or hardly distorted. At the same time, the distance between the transmission surface of the transparent body and the openings of the transmitter and/or of the receiver is shortened. The radiation beam cannot expand as much due to the short distance. Thus, the area needed for the transmitter and/or receiver for the transmission of the radiation beam is reduced, in particular with horizontally aimed image recorders with vehicle glazing installation angles deviating greatly from the vertical.

In a preferred embodiment, the transmission surface of the transparent body and the surface of the transparent pane, run parallel to each other with angle deviations of less than 2°. The greater the parallelism of the transmission surface and the surface of the transparent pane, the less the optical distortion of a radiation beam.

In another preferred embodiment, the transparent body has a maximum width of, preferably, 5 mm to 100 mm.

The coupling surface and the transmission surface of the transparent body are, preferably, implemented as trapezoids. The greater the viewing direction of the transmitter and/or receivers on the transparent pane deviates from the vertical, the more pronounced the trapezoid shape. Regions that are located closer to the opening of the transmitter and/or receiver can be implemented narrower, since the radiation beam can expand only slightly between the opening of the transmitter and/or receiver and the transparent body. Accordingly, in one embodiment, the width of the transparent body decreases to the top edge of the transparent pane.

In a preferred embodiment, the length of the transparent body is 10 mm to 200 mm.

The thickness of the transparent body is, preferably, 2 mm to 25 mm.

The transparent body contains, preferably, silicate glass, or polymethyl methacrylate, polycarbonate, cyclo-olefin polymers, polysulfone, polyurethane, polypropylene, polystyrene, polyamide, polyester, and/or polyvinyl chloride, as well as copolymers and/or combinations thereof. On the whole, all materials that are transparent to electromagnetic radiation beams of the transmitter and/or receiver are considered. For image recorders, high transparency to electromagnetic radiation in the visible range (380 nm to 750 nm) and/or near infrared (750 nm to 1200 nm) is preferred.

The transparent body has light transmission in the wavelength range from 380 nm to 750 nm of, preferably, more than 70%.

The transparent body can, preferably, have transmission of infrared radiation less than 50%, in order to minimize incoming radiation without useful information into the receiver.

A transmitter includes an opening for the emission of electromagnetic radiation, in particular, radiation beams. The electromagnetic radiation and, in particular, the radiation beams, can, after interaction with the matter, be reflected and detected via an opening on the receiver. From the signal, data about the distance between objects and the vehicle, surface characteristics of objects, and temperatures in the surroundings of vehicles can be calculated based on phase shifts and runtime measurements. Often, in the case of image recorders in the visible or infrared range, no transmitter is necessary; instead, signals are merely picked up from the surroundings. The source of the electromagnetic radiation can result from external transmitters. On the whole, transmitting and receiving of all electromagnetic radiation that are of interest to the driver and driver assistance systems for the operation of a vehicle are considered.

Driver assistance systems need, preferably, image data from the surroundings. Other road users, obstacles, traffic signs, and roadway markings can be recognized. By means of a computer-assisted evaluation system, the driver is actively or passively supported in the operation of the vehicle. With appropriate configuration, a vehicle can, by means of these data, even be operated autonomously.

Scattered light is the portion of electromagnetic radiation that is not directly transmitted or reflected by the transparent pane, the transparent body, or other components of the vehicle glazing or surroundings. This scattered light contains only very little or no exploitable information and is displaced in the receiver by the useful signal. Scattered light reduces the sensitivity of the receiver. Scattered light can be absorbed by a light-absorbing coating on side surfaces of the transparent body that do not lie directly in the beam path. Considered for the light-absorbing layer are, preferably, blackened polymer-containing paints that are mechanically and chemically stable after chemical reaction or evaporation of a solvent.

In one embodiment, the transparent body has light-absorbing parts on at least one side surface. The parts contain polyacrylic, polyurethane, polypropylene, polystyrene, polyamide, polyester, polyvinyl chloride, polycarbonate, and/or polymethyl methacrylate, as well as copolymers and/or combinations thereof. The light-absorbing parts can completely or partially surround the transparent body and areas outside the direct path of the electromagnetic radiation beams between transmitter and/or receiver. In one action, interfering scattered light is minimized. The light-absorbing parts can be referred to as scattered light shields.

In another preferred embodiment, the shape of the light-absorbing parts and/or the transparent body has inclined planes, openings, ridges, and/or threads for the positioning and installation of electromagnetic transmitter or receiving systems. This embodiment of the invention has, in particular, the advantage that the transmitter and/or receiver are positioned in a defined manner relative to the transparent pane and relative to the transparent body.

In another embodiment of the invention, the transparent body can have, on the side surfaces, completely or partially inclined planes, concave, convex shapes, and/or optical elements that are used for the coupling R_e and decoupling R_a of additional electromagnetic sensor signals on side surfaces, e.g., for rain detection systems.

In rain detection systems, a signal of moisture on the surface of the transparent pane coupled via the side surfaces is changed and detected as an outgoing signal. From the outgoing signal, the amount of moisture can be inferred by means of appropriate calculations.

In order to minimize optical reflection losses of electromagnetic radiation on the transmission surface of the transparent body, the transparent body includes, in a preferred embodiment, at least one antireflective layer.

Dereflection is the minimization of reflection losses of electromagnetic radiation at interfaces of media having different optical density. A body or a medium are optically dense if they have a refractive index greater than that of air. The refractive index of air is roughly 1.

Dereflection of surfaces can be realized by various measures. With interference optical layer systems, part of the reflected radiation is extinguished by means of destructive interference by coating the glass surface with two or more thin layers with different refractive indices. Alternatively, dereflection can be effected by a single-layer system if its refractive index corresponds to approx. the mathematical root of the refractive index of the underlying material. Layers include, in particular, silicon nitride and silicon oxide as well as all common transparent metal nitrides and/or mixtures thereof.

At least one more coating on the transmission surface or coupling surface of the transparent body contains conductive, transparent layers containing silver, tin oxide, zinc oxide, indium tin oxide, and/or mixtures thereof. In one embodiment of the invention, the transparent body can be heated by Joule heat using an electric current flow, in order to minimize condensation on the transparent body, in particular at low outside temperatures. The condensation would reduce the performance of the transmitter and sensitivity of the receiver through absorption and/or increased scattering.

The transparent pane contains, preferably, silicate glass, polystyrene, polyamide, polyester, polyvinyl chloride, polycarbonate, ethylene vinyl acetate, plasticized polyvinyl butyrals, polyurethanes, ionomers, and/or polymethyl methacrylate, as well as copolymers and/or combinations thereof. The transparent pane is particularly preferably developed as a laminated glass pane.

In another preferred embodiment, the transparent pane contains, at least on sub-regions and opaque coating with covering paint. The opaque covering paint completely or partially delimits the surface for the transmission of electromagnetic radiation to cover, for example, interfering mounting elements of the transmitter and/or receiver.

To increase mechanical stability, in a preferred embodiment, the transparent pane is curved in the longitudinal direction and/or the transverse direction.

The longitudinal direction is the direction roughly along the viewing direction of the transmitter and/or of the receiver. The length data refer to this direction. Accordingly, the width data refer to the transverse direction.

With highly curved transparent panes, the transparent body is also curved in a positively locking fashion in the longitudinal direction and/or the transverse direction.

The transparent polymer layer contains, preferably, polyacrylate, polyurethane, polypropylene, polystyrene, polyamide, polyester, polyvinyl chloride, polycarbonate, polymethyl methacrylate, ethylene vinyl acetate, plasticized polyvinyl butyrals, polyurethanes, polyacrylates, ionomers as well as copolymers and/or combinations thereof. The acrylic-based adhesive system VHB™ of the company 3M Deutschland GmbH, Neuss is used, for example, as the polymer layer.

In a preferred embodiment of the vehicle glazing, the transparent polymer layer is 0.5 mm to 2 mm, preferably 1.00 mm to 1.5 mm thick.

In the method according to the invention for the production of a vehicle glazing, one transparent pane is partially coated with an opaque covering paint. One transparent body and one transparent polymer layer applied on the contact surface are preheated and vacuum is applied under a vacuum bell to the transparent body with the transparent polymer layer. The transparent body with the transparent polymer layer on the transparent pane is aligned on the opaque covering paint and adhered while unrolled. The preheating is carried out, preferably, in the temperature range from 30° C. to 70° C.

In one embodiment of the method, in a preceding step of the method, the transparent pane is laminated from two transparent panes and polymer in an autoclave process.

The opaque covering paint can be applied in a silkscreening process, preferably, on the inside surface of the individual transparent pane, before the laminating process or on the outer surface of the transparent pane.

Unexpectedly and surprisingly, the new use of the vehicle glazing as a windshield for the transmission of electromagnetic radiation and for the installation of driver assistance systems was also found.

BRIEF DESCRIPTION OF THE DRAWINGS

An exemplary embodiment of the invention is depicted in the drawings and is described in greater detail in the following.

The drawings depict.

DETAILED DESCRIPTION

FIG. 1 through 6 are schematic representations that are intended to illustrate the principle of the invention. Consequently, the schematic representations need not be to scale.

Figure 1:
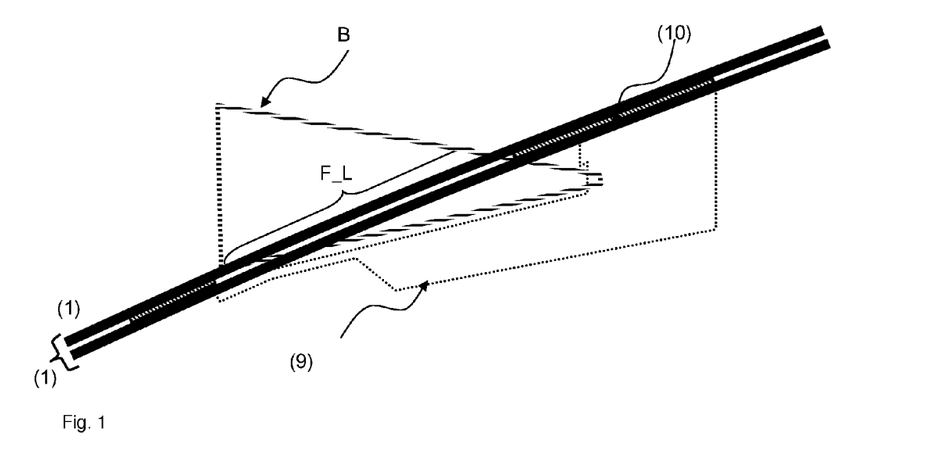
FIG. 1 a cross-section through a vehicle glazing and an image recorder according to the prior art, FIG. 2 a cross-section through a vehicle glazing and an image recorder according to the invention, FIG. 3 a plan view of a vehicle glazing according to the invention, FIG. 4 a cross-section through the line A-A in FIG. 3, FIG. 5 a cross-section through a vehicle glazing according to the invention, FIG. 6 a plan view of the transparent body, FIG. 7 an exemplary embodiment of the method according to the invention for the production of the vehicle glazing according to the invention in a flowchart.

In a comparative example in accordance with FIG. 1 according to the prior art, an image recorder (9) with a roughly horizontal viewing direction was installed on the interior side of a laminated glass windshield (1) laminated glass windshield (1). The resulting path of the electromagnetic radiation beam (B) during transmission through the laminated glass windshield (1) was observed. The laminated glass windshield (1) had an opaque border of the transmission region with covering paint (10).

The length L1 of the curved transparent pane (1) was 1 m; the maximum width B1, 1.5 m. The laminated glass windshield (1) had an Installation angle in a vehicle of 23° between the transparent pane and horizontal.

The electromagnetic radiation beam (B) through the transparent pane (1) and the transparent body (2) was imaged either not distorted or hardly distorted. The length of the surface F_L through the transparent pane (1) necessary for the transmission of the complete image was 67 mm.

Figure 2:
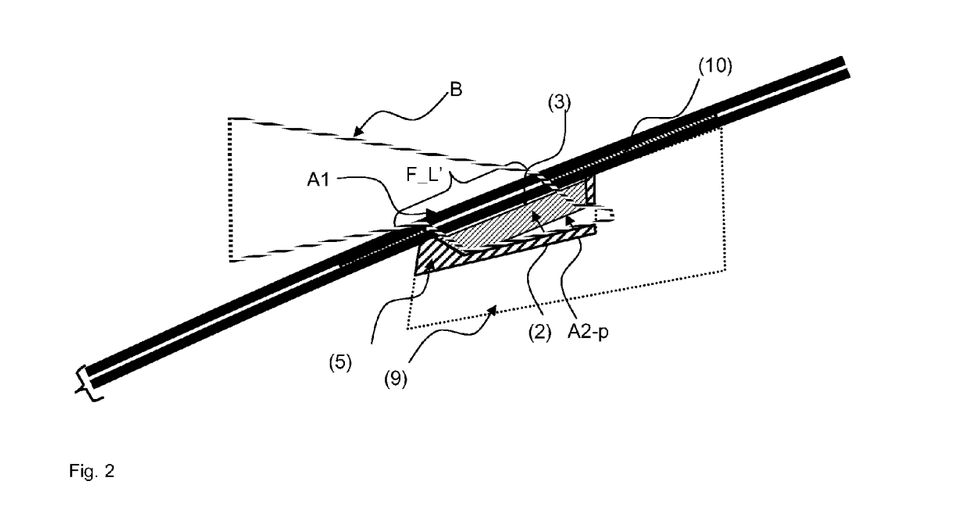
Figure 3:
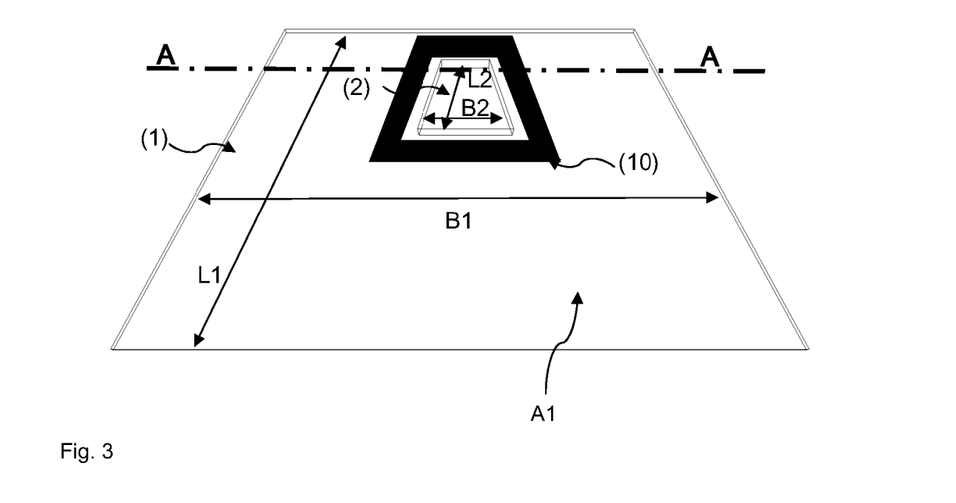
Figure 4:
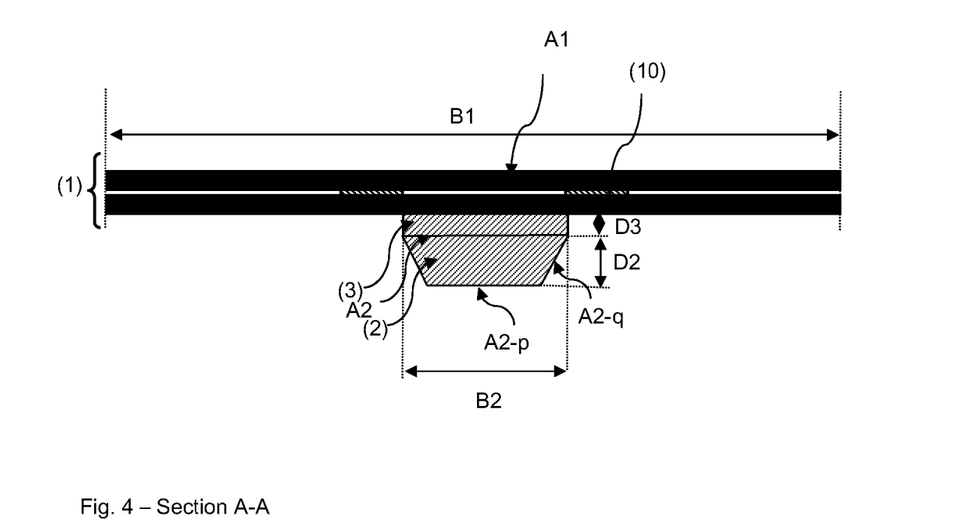

The exemplary embodiment according to FIG. 2 through 4 consisted of a laminated glass windshield as a transparent pane (1) and a transparent body (2) with polycarbonate. FIG. 2 depicts the resulting path of the electromagnetic radiation beam (B) during transmission through the transparent pane (1), the transparent polymer layer (3), and the transparent body (2). FIG. 2 shows the length of the surface for the transmission of electromagnetic radiation F-L' with the glazing according to the invention. Likewise depicted is the radiation beam (B) and the transmission surface of the transparent body A2-p. The surface A1 depicted in FIGS. 2, 3 and 4 of the transparent pane (1) and the transmission surface A2-p of the transparent body (2) were connected parallel to each other with an angle deviation of less than 2° in a positively locking fashion over the coupling surface A2. The transparent laminated glass windshield (1) and, accordingly, the transparent body (2) had an installation angle of 23° between the transparent pane (1) and horizontal. The length L1 of the curved transparent pane (1) was 1 m; the width B1 was 1.5 m. The laminated glass windshield (1) had an opaque border of the transmission region with covering paint (10). The length L2 of the transparent body (2) was 5 cm; the maximum width B2 was 5 cm; the thickness D2 was 7.5 mm. The polymer layer (3) was a self-adhesive acrylic-containing highly transparent film 3M VHB™ 4905 with a thickness D3 of 0.5 mm. For the characterization, an image recorder (9) with a roughly horizontal viewing direction was mounted on the passenger compartment side. Light-absorbing parts (5) with polycarbonate were used for insulation of the image recorder and minimization of light scattering.

The electromagnetic radiation beam (B) through the transparent pane (1) and the transparent body (2) was imaged either not distorted or hardly distorted. The length of the surface F_L' through the transparent pane (1) necessary for the transmission of the complete image was 37 mm.

Figure 5:
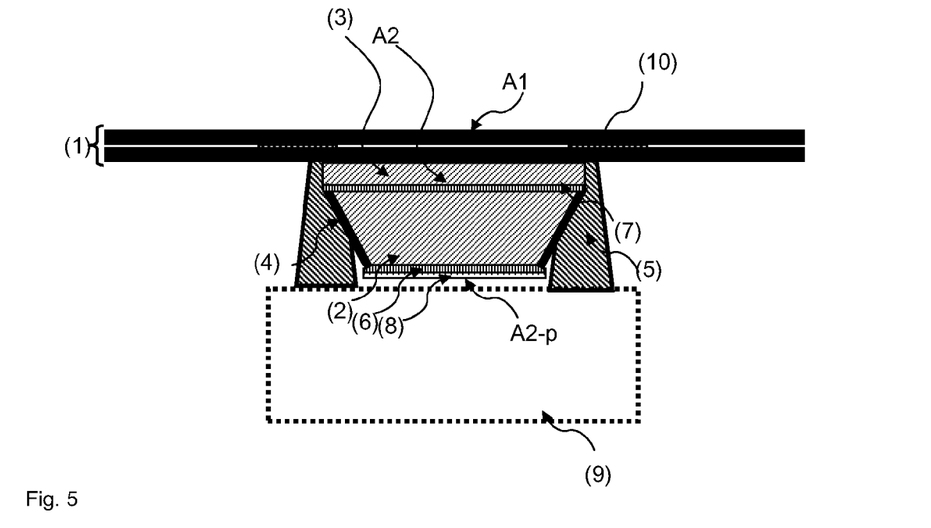

FIG. 5 shows a cross-section through the vehicle glazing according to the invention, comprising the transparent pane (1), a positioning and mounting device (5) for a transmitting and/or receiving system (9), light-absorbing coatings (4), conductive transparent layers (6), (7) on the transmission surface A2-p and coupling surface A2, and an antireflective layer (8) on the transmission surface A2-p.

Figure 6:
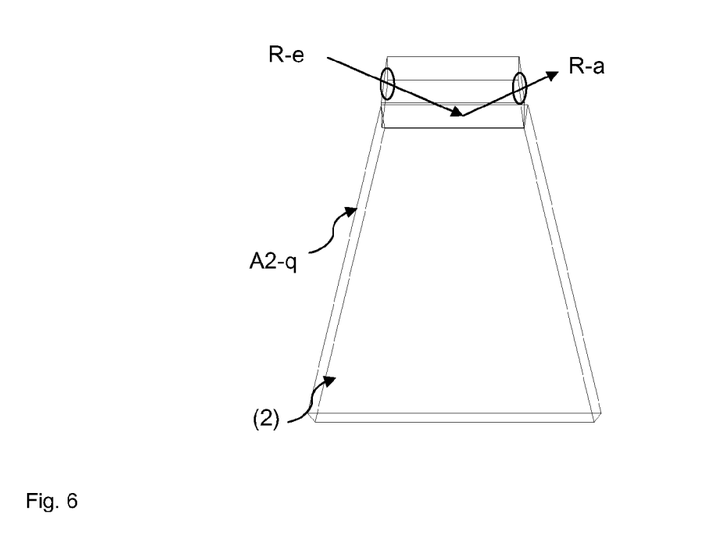

FIG. 6 shows a plan view of the transparent body (2) taking into account the integration of a rain detection system with a coupled signal R-e and a decoupled signal R-a in a sub-region of the transparent body (2).

Figure 7:
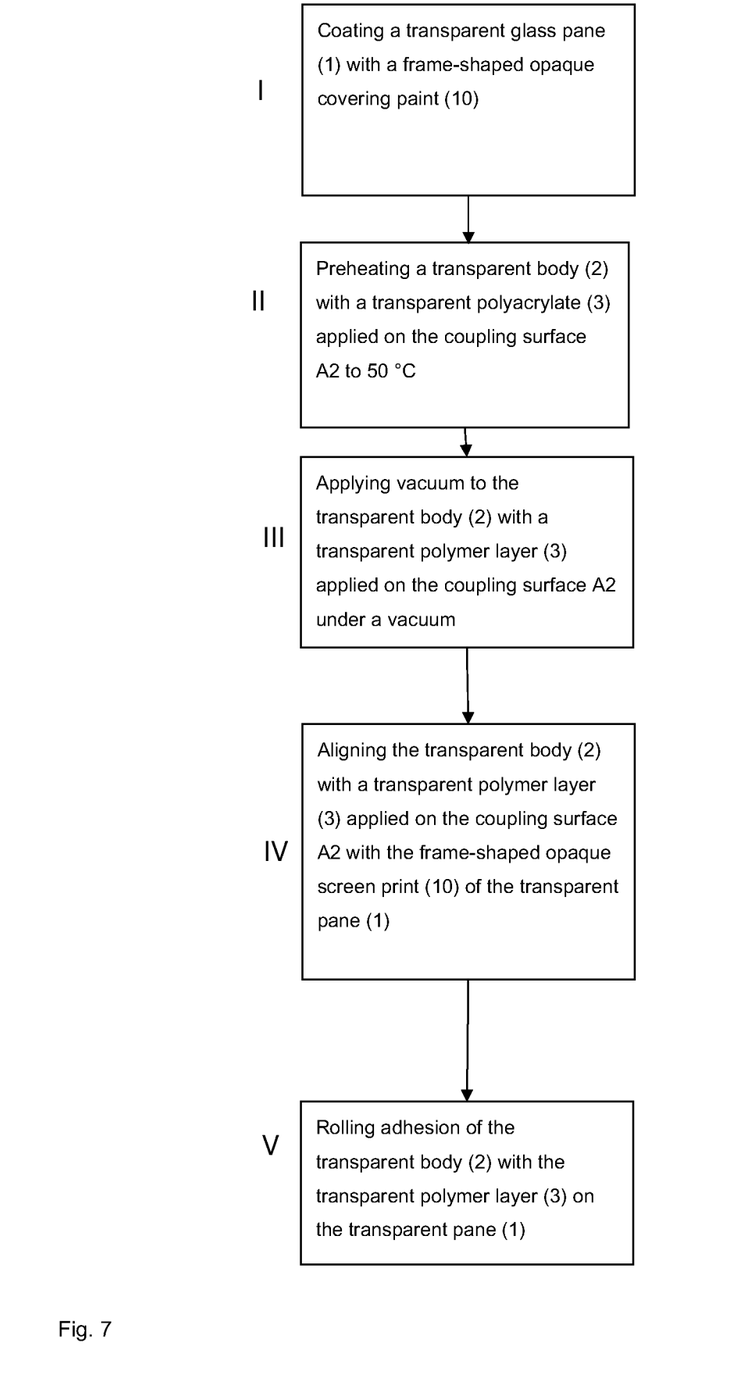

FIG. 7 depicts an exemplary embodiment of the method according to the invention for the production of the vehicle glazing according to the invention in a flowchart. The five steps of the method depicted are a preferred embodiment of the method according to the invention.

The results from the comparative example (FIG. 1) and the exemplary embodiment (FIG. 2) are presented in Table 1.

TABLE 1

| Example | Installation angle of the glazing [°] | Length of the surface needed for the transmission of the image B | |
|---|---|---|---|
| | | Reference | [mm] |
| Comparative example FIG. 1 | 23 | F-L | 67 |
| Exemplary embodiment FIG. 2 | 23 | F-L' | 37 |

The length of the surface F_L' needed for the transmission of the complete image B through the transparent pane (1) was only 37 mm and was, compared to the comparative example, reduced by 30 mm. The advantage resides in the fact that a smallest possible surface of the vehicle glazing is necessary for the undistorted transmission of electromagnetic radiation beams of transmitters and receivers of driver assistance systems.

LIST OF REFERENCE CHARACTERS (1) transparent pane,
(2) transparenter body,
(3) polymer layer,
(4) light-absorbing coating,
(5) light-absorbing parts,
(6) conductive transparent coating,
(7) conductive transparent coating,
(8) antireflective layer,
(9) transmitting and/or receiving system,
(10) opaque covering paint
A1 outer surface of the transparent pane (1),
A2 coupling surface of the transparent body (2),
A2-$p$ transmission surface of the transparent body (2) parallel to the outer surface A1 of the transparent pane (1),
A2-$q$ side surface of the transparent body (2),
L1 length of the transparent pane (1),
B1 width of the transparent pane (1),
L2 length of the transparent body (2),
B2 maximum width of the transparent body (2),
D2 thickness of the transparent body (2),
D3 thickness of the polymer layer (3),
B radiation beam through a glazing,
F_L length of the surface for the transmission of electromagnetic radiation,
F_L' length of the surface for the transmission of electromagnetic radiation with the glazing according to the invention,
R-e coupled signal
R-a decoupled signal.

The invention claimed is:

1. A vehicle glazing, comprising:
   a) at least one transparent pane,
   b) a transparent body, and
   c) at least one transparent polymer layer interposed between them,
wherein the transparent body comprises polycarbonate and is connected in a positively locking fashion to the transparent pane via the transparent polymer layer over at least one coupling surface, wherein a maximum width and a maximum length of the transparent body are respectively smaller than a minimum width and a minimum length of the transparent pane, and wherein a transmission surface of the transparent body and a surface of the transparent pane run substantially parallel to each other with maximum angle deviations of less than 10°.

2. The vehicle glazing according to claim 1, wherein the transmission surface of the transparent body and the surface of the transparent pane run substantially parallel to each other with maximum angle deviations of less than 2°.

3. The vehicle glazing according to claim 1, wherein the transparent body has a maximum width of 5 mm to 100 mm.

4. The vehicle glazing according to claim 1, wherein the coupling surface, side surfaces, and the transmission surface of the transparent body form a substantially trapezoidal shape.

5. The vehicle glazing according to claim 1, wherein the transparent body has a length of 10 mm to 200 mm and/or a thickness of 2 mm to 25 mm.

6. The vehicle glazing according to claim 1, wherein a light-absorbing layer is provided on a side surface of the transparent body.

7. The vehicle glazing according to claim 1, further comprising light-absorbing parts, the light-absorbing parts including inclined planes, openings, ridges, and/or threads for positioning and installation of electromagnetic transmitting or receiving systems.

8. The vehicle glazing according to claim 1, wherein the transparent body has, in a sub-region, inclined planes, concave and/or convex curves for coupling and decoupling of electromagnetic sensor signals on side surfaces.

9. The vehicle glazing according to claim 1, wherein the transmission surface of the transparent body has at least one antireflective layer.

10. The vehicle glazing according to claim 1, further comprising at least one coating on the transmission surface of the transparent body and/or at least one coating on the coupling surface of the transparent body.

11. The vehicle glazing according to claim 1, wherein the transparent pane comprises at least partially a coating with covering paint and wherein the coating with covering paint completely or partially delimits the surface for transmission of electromagnetic radiation.

12. The vehicle glazing according to claim 1, wherein the transparent pane is curved in the longitudinal direction and/or transverse direction.

13. The vehicle glazing according to claim 6, further comprising light-absorbing parts, the light-absorbing parts including inclined planes, openings, ridges, and/or threads for the positioning and installation of electromagnetic transmitting or receiving systems.

14. The vehicle glazing according to claim 6, wherein the transparent body has, in a sub-region, inclined planes, concave and/or convex curves for coupling and decoupling of electromagnetic sensor signals on side surfaces.

15. The vehicle glazing according to claim 9, wherein the antireflective layer contains silicon dioxides, silicates, silicon nitrides, metal nitrides, and/or mixtures thereof.

16. The vehicle glazing according to claim 10, wherein the at least one coating on the transmission surface of the transparent body and/or the at least one coating on the coupling surface of the transparent body are conductive, transparent coatings containing silver, tin oxide, zinc oxide, Indium tin oxide, and/or mixtures thereof.

17. A method for production of the vehicle glazing according to claim 1, comprising:
   a) providing a transparent pane, the transparent pane partially coated with a covering paint,
   b) providing a transparent body and a transparent polymer layer applied on a coupling surface of the transparent body and preheating the transparent body and the transparent polymer layer, wherein the transparent body comprises polycarbonate,
   c) applying a vacuum to the transparent body and the transparent polymer layer,
   d) aligning the transparent body and the transparent polymer layer on the transparent pane, and
   e) adhering the transparent body and the transparent polymer layer onto the transparent pane by unrolling the transparent body and the transparent polymer layer.

18. The method for the production of a transparent pane according to claim 17, wherein the transparent pane is laminated from two transparent panes in an autoclave.

19. A method of using the vehicle glazing according to claim 1, comprising using the vehicle glazing as a windshield for the transmission of electromagnetic radiation and for the installation of driver assistance systems.

* * * * *